United States Patent
Kim et al.

(10) Patent No.: US 7,462,390 B2
(45) Date of Patent: Dec. 9, 2008

(54) ACRYLIC PRESSURE-SENSITIVE ADHESIVE COMPOSITION FOR POLARIZING FILM

(75) Inventors: Se-ra Kim, Daejeon (KR); Suk-ky Chang, Daejeon (KR); Hyun-ju Cho, Gimhae-si (KR); Jae-gwan Lee, Daejeon (KR); In-cheon Han, Seoul (KR); Hye-ran Seong, Seoul (KR)

(73) Assignee: LG Chem, Ltd., Seoul (KR)

( * ) Notice: Subject to any disclaimer, the term of this patent is extended or adjusted under 35 U.S.C. 154(b) by 412 days.

(21) Appl. No.: 11/109,951

(22) Filed: Apr. 20, 2005

(65) Prior Publication Data

US 2005/0239965 A1    Oct. 27, 2005

(30) Foreign Application Priority Data

Apr. 23, 2004    (KR)    ........... 10-2004-0028355

(51) Int. Cl.
    *B32B 27/30*    (2006.01)
(52) U.S. Cl. .............. 428/355 AC; 349/149; 526/931; 528/272
(58) Field of Classification Search .......... 428/423.1, 428/188, 355 R, 355 EN, 355 CN, 355 AC; 526/931; 349/149; 528/271, 272
    See application file for complete search history.

(56) References Cited

U.S. PATENT DOCUMENTS 4,477,622 A * 10/1984 Sanderson et al. .......... 524/522
7,138,170 B2 * 11/2006 Bourdelais et al. .......... 428/188
7,252,733 B2 * 8/2007 Wang et al. .................. 156/230

FOREIGN PATENT DOCUMENTS

| JP | 64-066283 | 3/1989 |
| JP | 1998-079266 | 11/1998 |
| JP | 2002-047468 | 2/2002 |
| JP | 2003-049141 | 2/2003 |

* cited by examiner

*Primary Examiner*—Thao T. Tran
(74) *Attorney, Agent, or Firm*—McKenna Long & Aldridge LLP

(57) ABSTRACT

The present invention provides an acrylic pressure-sensitive adhesive composition for a polarizing film comprising a) 100 parts by weight of a (meth)acrylic copolymer having a high molecular weight, which is copolymerized from a (meth)acrylic acid ester monomer and a vinylic and/or an acrylic monomer having a functional group capable of crosslinking with a multifunctional crosslinking agent and has a weight-average molecular weight of at least 1,000,000; b) 5-20 parts by weight of a (meth)acrylic copolymer having a low molecular weight, which comprises the same monomer of the main chain of a) the (meth)acrylic copolymer having a high molecular weight, has a weight-average molecular weight of 2,000-30,000 and comprises 0.01-1 monomer, per one molecule of the copolymer on average, having a functional group capable of reacting with the crosslinking agent of c); and c) 0.01-10 parts by weight of a multifunctional crosslinking agent.

10 Claims, No Drawings

ACRYLIC PRESSURE-SENSITIVE ADHESIVE COMPOSITION FOR POLARIZING FILM

CROSS-REFERENCE TO RELATED APPLICATION

This application claims the benefit of Korean Patent Application No. 10-2004-0028355, filed Apr. 23, 2004 in Korea, which are hereby incorporated by reference in their entirety.

BACKGROUND OF THE INVENTION

1. Field of the Invention

The present invention relates to an acrylic pressure-sensitive adhesive composition for a polarizing film, more particularly to a pressure-sensitive adhesive composition for a polarizing film capable of solving the light leakage problem, a polarizing film prepared therefrom and a liquid crystal display device using the same.

2. Description of the Related Art

In general, a liquid crystal cell containing liquid crystals and a polarizing film are basically needed to manufacture a liquid crystal display device. An adequate adhesive layer or a pressure-sensitive adhesive layer is required to join them. In addition, a phase retardation film, a compensation film for wide view angle, a brightness enhancement film, etc. may be further joined to the polarizing film in order to improve the performance of a liquid crystal display device.

Typically, a liquid crystal display comprises a uniformly aligned liquid crystal layer; a polarizing film comprising a liquid crystal cell, which consists of a transparent glass plate or a plastic plate including a transparent electrode layer and an adhesive layer or a pressure-sensitive adhesive layer; a phase retardation film; and additional functional film layers.

The polarizing film contains regularly aligned iodine compounds or dichromic polarizing materials and has a multilayer structure to protect these polarizing elements by forming protecting films made of triacetyl cellulose (TAC), etc. on both sides of the film. The polarizing film may further comprise a phase retardation film having an anisotropic molecular alignment, a compensation film for wide view angle such as an optically designed liquid crystal film, etc.

Because these films are made of materials having different molecular structures and compositions, they have different physical properties. Especially, under a specific thermal and/or humidity condition, materials having an anisotropic molecular alignment shrink or expand, which causes the lack of dimensional stability. As a result, if the polarizing film is fixed by a pressure-sensitive adhesive, a shear stress caused the thermal and/or humidity condition remains, so that light leakage occurs at the region where the stress is concentrated.

One way to solve the problem of light leakage is to reduce the shrinkage of the polarizing film at the thermal and/or humidity condition. However, it is very difficult to remove the stress applied to a liquid crystal panel to which a polarizing film consisting of different materials has been attached.

Rubbers, acryls and silicones are commonly used as pressure-sensitive adhesives. Among these, acrylic pressure-sensitive adhesives are used the most widely in manufacturing high performance pressure-sensitive adhesive compositions. Molecular characteristics of adhesive materials, such as molecular weight and distribution, cross-linking density, and composition, mainly influence the durability of pressure-sensitive adhesives, which may be controlled by the high adhesive strength and cohesive strength.

However, when a polarizing film manufactured using such a pressure-sensitive adhesive is used for a long time under a specific thermal and/or humidity condition in a liquid crystal display, stress tends to concentrate because of the shrinkage of the polarizing film. To solve this problem, the adhesive layer needs to have a stress relaxation ability.

For this purpose, Japan Patent Publication No. Hei 1-66283 disclosed a polarizing film employing an acrylic pressure-sensitive adhesive layer mainly comprising (meth)acrylic acid alkyl ester having alkyl groups with 1-12 carbon atoms, in which the pressure-sensitive adhesive layer comprises the polymer constituent having a weight-average molecular weight of at most 100,000 in less than 15 wt % and the polymer constituent having a weight-average molecular weight of at least 1,000,000 in more than 10 wt %. Although the polarizing film employing the adhesive comprising a lot of polymer constituent having a high molecular weight has good adhesion durability, it is difficult to relax the stress caused by the dimensional change of the polarizing film because the adhesive has large cohesive force (elasticity).

Korea Patent Publication No. 1998-079266 attempted to solve the problem of light leakage by offering a stress-relaxation property to the pressure-sensitive adhesive composition, which comprises 100 parts by weight of a high molecular weight acrylic copolymer having a weight-average molecular weight of at least 1,000,000, 20-200 parts by weight of a low molecular weight acrylic copolymer having a weight-average molecular weight of at most 30,000 and 0.005-5 parts by weight of a multifunctional crosslinking agent. However, because of the too high content of the low molecular weight acrylic copolymer having a molecular weight of at most 30,000 and lack of compatibility, it is difficult to ensure durability as bubble and edge lifting at high temperature and high humidity. In particular, the patent did not mention the method of preventing the durability problem caused by surface transference of the material having a low molecular weight after a considerable lapse of time.

Japan Patent Publication No. 2002-47468 attempted to offer stress-relaxation with a pressure-sensitive adhesive composition for a polarizing film comprising 100 parts by weight of a high molecular weight acrylic copolymer having a weight-average molecular weight ranging from 800,000 to 2,000,000, 5-50 parts by weight of a low molecular weight acrylic copolymer having a with no functional groups and weight-average molecular weight of at most 50,000 or having a degree of dispersion ranging from 1.0 to 2.5 and having no functional groups, a crosslinking agent and a silane compound. However, it did not mention the problems of non-homogeneous adhesion strength and durability after a prolonged time due to surface transference of the material having a low molecular weight and compatibility with the material having a high molecular weight.

Japan Patent Publication No. 2003-49141 attempted to solve the problem of light leakage by offering stress-relaxation with a pressure-sensitive adhesive composition for a polarizing film comprising a high molecular weight acrylic copolymer having a weight-average molecular weight ranging from 1,000,000 to 2,000,000 and having functional groups, a medium molecular weight acrylic copolymer having a weight-average molecular weight ranging from 30,000 to 300,000 and having less than two functional groups, a low molecular weight acrylic copolymer having a weight-average molecular weight ranging from 1,000 to 20,000 (degree of dispersion=1.0-2.5) and having no functional groups and a crosslinking agent. While this patent employs the acrylic copolymer having a medium molecular weight and having functional groups, the acrylic copolymer having a low molecular weight and having no functional groups may cause durability problem after a prolonged time because of surface transference. To solve this problem, the acrylic copolymer having a high molecular weight and the acrylic copolymer having a low molecular weight should be compatible with each other. However, this patent did not mention it.

It is also possible to control the crosslinking density by chemical bonding in order to offer stress-relaxation to the pressure-sensitive adhesive. However, it is insufficient to solve the stress concentration problem of the polarizing film. Moreover, if the crosslinking density is too low, the durability problem may occur.

Accordingly, a novel pressure-sensitive adhesive for a polarizing film capable of solving the light leakage problem while maintaining major characteristics of the polarizing film even at high temperature and humidity conditions and after a prolonged time and a polarizing film using the same are urgently needed.

SUMMARY OF THE INVENTION

It is an object of the present invention to provide an acrylic pressure-sensitive adhesive composition for a polarizing film capable of solving the light leakage problem while maintaining such major characteristics as adhesion durability under high temperature and high humidity conditions.

It is another object of the present invention to provide a polarizing film using the acrylic pressure-sensitive adhesive composition.

It is still another object of the present invention to provide a liquid crystal display device comprising the polarizing film prepared with the acrylic pressure-sensitive adhesive composition.

The above objects of the present invention can be attained by the present invention.

In order to attain the objects, the present invention provides an acrylic pressure-sensitive adhesive composition for a polarizing film comprising a) 100 parts by weight of a high molecular weight (meth)acrylic copolymer copolymerized from a (meth)acrylic acid ester monomer and a vinylic and/or an acrylic monomer crosslinkable with a mutifunctional crosslinking agent and having a weight-average molecular weight of at least 1,000,000; b) 5-20 parts by weight of a low moleculer weight (meth)acrylic copolymer comprising the same monomer comprised in the main chain of the high moleculer weight (meth)acrylic copolymer of a), having a weight-average molecular weight ranging from 2,000 to 30,000 and comprising 0.01-1 monomer, per one molecule of the copolymer on average, having a functional group capable of reacting with the crosslinking agent of c); and c) 0.01-10 parts by weight of a mutifunctional crosslinking agent.

The present invention also provides polarizing film comprising an adhesive layer of the acrylic pressure-sensitive adhesive composition on one or both sides of the polarizing film.

The present invention further provides a liquid crystal display device comprising a liquid crystal panel, in which the pressure-sensitive adhesive polarizing film is joined on one or both sides of the liquid crystal cell.

DETAILED DESCRIPTION OF THE INVENTION

Hereunder is given a detailed description of the present invention.

Conventionally, in order to solving the light leakage problem, a plasticizer or, optionally, a copolymer having a low molecular weight was added to a copolymer having a high molecular weight to offer stress-relaxation ability to a pressure-sensitive adhesive. The existence of the copolymer having a low molecular weight in the network formed by the copolymer having a high molecular weight increases fluidity and relaxes the stress concentrated by shrinkage or expansion of the polarizing film, thereby solving the light leakage problem. However, the copolymer having a low molecular weight may cause the durability problem after a prolonged time because of surface transference.

The present invention attempts to improve compatibility with the copolymer having a high molecular weight in order to solve the durability problem caused by surface transference of the copolymer having a low molecular weight. That is, the monomer constituting the main chain of the copolymer having a low molecular weight should be equal to that of the copolymer having a high molecular weight. Since the copolymer having a low molecular weight has 0.01-1 functional group, per one molecule on average, capable of reacting with the multifunctional crosslinking agent, the durability problem due to surface transference of the copolymer having a low molecular weight does not occur. Also, because the copolymer having a low molecular weight does not form a network structure, concentration of stress can be effectively prevented. Consequently, durability and the light leakage problem can be improved simultaneously.

The pressure-sensitive adhesive composition of the present invention comprises a (meth)acrylic copolymer having a high molecular weight, a (meth)acrylic copolymer having a low molecular weight and a multifunctional crosslinking agent. The (meth)acrylic copolymer having a low molecular weight comprises the same (meth)acrylic monomer having a reactive functional group as that of the (meth)acrylic copolymer having a high molecular weight. That is to say, since the (meth)acrylic copolymer having a low molecular weight has 0.01-1 functional group on average per one molecule, surface transference of the copolymer having a low molecular weight can be prevented. Thus, the light leakage problem is solved by the stress-relaxation ability, while satisfying the adhesion durability.

The adhesive composition of the present invention can be used in a variety of pressure-sensitive adhesives or adhesives for optical purposes without limitation, including acryls, silicons, rubberys, urethanes, polyesters and epoxy compounds. Among these, the acrylic adhesive is preferable.

Hereunder is given a specific description of each component of the pressure-sensitive adhesive composition.

a) The (meth)acrylic copolymer having a high molecular weight is a copolymer comprising a (meth)acrylic acid ester monomer as main constituent and a vinylic and/or an acrylic monomer having a functional group crosslinkable with a multifunctional crosslinking agent. It comprises 91.0-99.9 parts by weight of the (meth)acrylic acid ester monomer and 0.1-9 parts by weight of the vinylic and/or the acrylic monomer having a functional group crosslinkable with a multifunctional crosslinking agent.

If the alkyl group of the (meth)acrylic acid ester monomer, which is the base monomer of a) the (meth)acrylic copolymer, has the form of a long chain, cohesive force of the adhesive decreases at high temperature. Thus, the (meth)acrylic acid ester monomer preferably has an alkyl group having 1-12 carbon atoms, in order to maintain good cohesive force at high temperature. More preferably, it is an alkyl ester having 2-8 carbon atoms, such as butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, 2-ethylbutyl (meth)acrylate and benzyl acrylate. These monomers can be used alone or in combination.

Preferably, the (meth)acrylic acid ester monomer is comprised in 91.0-99.9 parts by weight. If the content is below 91.0 parts by weight, adhesive strength with the polarizing film may worsen. Otherwise, if it exceeds 99.9 parts by weight, the durability may worsen because of low cohesive force.

The vinylic monomer and/or the acrylic monomer having a functional group capable of crosslinking reacts with the crosslinking agent and offers cohesive force or adhesion strength by chemical bonding, so that the cohesive force of the adhesive does not decrease at high temperature and high humidity. The monomer having a functional group capable of crosslinking may be the one having a hydroxy group, such as 2-hydroxyethyl (meth)acrylate, 2-hydroxypropyl (meth)acrylate, 2-hydroxyethylene glycol (meth)acrylate and 2-hydroxypropylene glycol (meth)acrylate, or the one having a carboxyl group, such as acrylic acid, methacrylic acid, acrylic acid dimer, itaconic acid, maleic acid and maleic acid anhydride, but is not limited to them. These monomers may be used alone or in combination.

Preferably, the vinylic monomer and/or the acrylic monomer having a functional group capable of crosslinking or the mixture thereof is comprised in 0.1-9 parts by weight. If the content of the monomer having a functional group capable of crosslinking is below 0.1 parts by weight, cohesive failure tends to occur at high temperature and/or high humidity conditions and improvement of adhesive strength is only slight. Otherwise, if it exceeds 9 parts by weight, the compatibility decreases, so that surface transference becomes severe, thereby impairing fluidity and reducing stress-relaxation ability due to increased cohesive force.

Preferably, a) the (meth)acrylic copolymer having a high molecular weight has a weight-average molecular weight of at least 1,000,000, more preferably ranging from 1,000,000 to 2,000,000. If the weight-average molecular weight is smaller than 1,000,000, durability problem as bubble or edge lifting may occur under high temperature and/or high humidity conditions because of insufficient cohesive force. Otherwise, if it exceeds 2,000,000, the ability of relaxing stress concentration is lowered.

b) The (meth)acrylic copolymer having a low molecular weight is prepared from the same monomer that is used to prepare the (meth)acrylic copolymer having a high molecular weight. It should have polymer 0.01-1 functional group, per one molecule of the polymer on average, capable of reacting with a multifunctional crosslinking agent.

That is to say, the (meth)acrylic copolymer having a low molecular weight should comprise the same monomer that is used to prepare the (meth)acrylic copolymer having a high molecular weight in order to solve the durability problem related with surface transference. And, it should have 0.01-1 functional group, per one molecule of the copolymer on average, capable of reacting with a multifunctional crosslinking agent, so that concentration of stress can be effectively prevented without the copolymer having a low molecular weight forming a network structure. Resultantly, the problems of durability and light leakage can be improved simultaneously.

Preferably, the (meth)acrylic copolymer having a low molecular weight has a weight-average molecular weight ranging from 2,000 to 30,000. If the weight-average molecular weight is smaller than 2,000, the adhesion durability may worsen. Otherwise, if it exceeds 30,000, the flexibility worsens, so that it becomes difficult to solve the light leakage problem.

Preferably, the (meth)acrylic copolymer having a low molecular weight is comprised in 5-20 parts by weight per 100 parts by weight of a) the (meth)acrylic copolymer having a high molecular weight. If the content is below 5 parts by weight, concentration of stress is not sufficiently relaxed. Otherwise, if it exceeds 20 parts by weight, the cohesive force worsens, and thus the durability problem may occur.

The method of preparing a) the (meth)acrylic copolymer having a high molecular weight or b) the (meth)acrylic copolymer having a low molecular weight is not particularly limited. They can be prepared, for example, by solution polymerization, photopolymerization, bulk polymerization, suspension polymerization, emulsion polymerization, etc. Particularly, it is preferable to prepare the acrylic copolymer of the present invention by solution polymerization at a polymerization temperature of 50° C.-140° C. Also, it is preferable to add a polymerization initiator when the monomers are mixed uniformly.

The polymerization initiator may be an azo based polymerization initiator such as azobisisobutyronitrile and azobiscyclohexanecarbonitrile, a peroxide such as benzoyl peroxide and acetyl peroxide or a mixture thereof.

Also, a chain transfer agent like mercaptan, such as lauryl mercaptan, n-dodecyl mercaptan and n-octyl mercaptan, or α-methylstyrene dimer can be used along with the polymerization initiator in preparing the copolymer having a low molecular weight.

c) The multifunctional crosslinking agent reacts with the carboxyl group or the hydroxy group to increase cohesive force of the adhesive.

The crosslinking agent may be an isocyanate compound, an epoxy compound, an aziridine compound or a metal chelate compound. Particularly, an isocyanate compound is preferable considering easiness of use. The isocyanate compound may be tolylene diisocyanate, xylene diisocyanate, diphenylmethane diisocyanate, hexamethylene diisocyanate, isoform diisocyanate, tetramethylxylene diisocyanate, naphthalene diisocyanate or reaction products of these with such polyol as trimethylolpropane. The epoxy compound may be ethylene glycol diglycidyl ether, triglycidyl ether, trimethylolpropane triglycidyl ether, N,N,N',N'-tetraglycidylethylene diamine, glcyerine diglycidyl ether, etc. The aziridine compound may be N,N'-toluene-2,4-bis(1-aziridinecarboxide), N,N'-diphenylmethane-4,4'-bis(1-aziridinecarboxide), triethylene melamine, bisisoprothaloyl-1-(2-methylaziridine), tri-1-aziridinylphosphine oxide, etc. The metal chelate compound may be the one in which a multivalent metal element such as aluminum, iron, zinc, tin, titanium, antimony, magnesium and vanadium is coordinated with acetylacetone or ethyl acetoacetate.

Preferably, the crosslinking agent is comprised in 0.01-10 parts by weight per 100 parts by weight of the (meth)acrylic copolymer having a high molecular weight.

The method of preparing the adhesive composition is not particularly limited. It can be obtained by mixing the acrylic copolymer and the crosslinking agent by the conventional method.

It is required that the multifunctional crosslinking agent not participate in crosslinking while it is mixed to form an adhesive layer in order to obtain a uniform coating. Following the coating process, an elastic, crosslinked adhesive layer with a strong cohesive force is obtained by drying and aging. The strong cohesive force of the adhesive contributes to improving adhesion and cutting properites.

Preferably, the acrylic pressure-sensitive adhesive composition of the present invention has a crosslinking density of 5-95%, more preferably 15-80%, considering the optimum physical property balance. Here, the crosslinking density refers the crosslinked portion in wt % of the acrylic adhesive undissolved by the solvent in the gel content measuring method. If the pressure-sensitive adhesive has a crosslinking density less than 5%, the cohesive force of the adhesive decrease and such adhesion durability problem as bubble or edge lifting may occur. Otherwise, if it exceeds 95%, stress concentration by contraction of the polarizing film is not sufficiently relaxed.

The acrylic pressure-sensitive adhesive composition of the present invention may further comprise a silane coupling agent, which improves heat and moisture resistance by improving adhesion stability, when attached to a glass plate. Particularly, the silane coupling agent improves adhesion reliability when the adhesive is kept under high temperature and high humidity conditions for a long time.

The silane coupling agent may be γ-glycidoxypropyltrimethoxysilane, γ-glycidoxypropylmethyldiethoxysilane, γ-glycidoxypropyltriethoxysilane, 3-mercaptopropyl trimethoxysilane, vinyltrimethoxysilane, vinyltriethoxysilane, γ-methacryloxypropyltrimethoxysilane, γ-methacryloxypropyltriethoxysilane, γ-aminopropyltrimethoxysilane, γ-aminopropyltriethoxysilane, 3-isocyanatepropyltriethoxysilane, γ-acetoacetatepropyltrimethoxysilane or a mixture thereof. It may be comprised in 0.005-5 parts by weight per 100 parts by weight of the (meth)acrylic copolymer having a high molecular weight.

The acrylic pressure-sensitive adhesive composition of the present invention may further comprise a tackifiers. The tackifier may be a (hydrated) hydrocarbon resin, a (hydrated) rosin resin, a (hydrated) rosin ester resin, a (hydrated) terpene resin, a (hydrated) terpene phenol resin, a polymerized rosin resin, a polymerized rosin ester resin or a mixture thereof.

The tackifier may be comprised in 1-100 parts by weight per 100 parts by weight of the (meth)acrylic copolymer having a high molecular weight. If the tackifier is used in excess, compatibility or cohesive force of the adhesive may decrease.

Besides, the acrylic pressure-sensitive adhesive composition of the present invention may further comprise a plasticizer, an epoxy resin, a hardener, etc. depending on purposes. Also, a UV stabilizer, an antioxidant, a colorant, a reinforcing agent, a filler, a defoaming agent, a surfactant, etc. may be added.

The present invention also provides a polarizing film comprising the above-described acrylic pressure-sensitive adhesive composition as adhesive layer of the polarizing film.

The polarizing film of the present invention has an adhesive layer made of the pressure-sensitive adhesive composition on one or both sides of the polarizing film. The polarizing material or element of the polarizing film is not particularly limited.

Preferably, the polarizing film may be, for example, the one prepared by adding such polarizing component as iodine or dichromic dye to a film made of a polyvinyl alcohol resin. The thickness of the polarizing film is not particularly limited. The polyvinyl alcohol resin may be polyvinyl alcohol, polyvinyl formal, polyvinyl acetal or gummed ethylene and vinyl acetate copolymer.

On both sides of the polarizing film, protecting films consisting of a cellulose film made of, for example, triacetyl cellulose, a polycarbonate film, a polyester film made of, for example, polyethylene terephthalate, a polyether sulfone film or polyethylene, polypropylene, polyolefin having a cyclo or norbornene structure or an ethylene-propylene copolymer may be formed. The thickness of these protecting films is not particularly limited.

The method of forming the adhesive layer on the polarizing film is not particularly limited. The pressure-sensitive adhesive may be directly coated on the polarizing film using a bar coater, etc., and then dried. Or, after the adhesive is coated on a easily-peeling substrate and then dried, the adhesive layer formed on the substrate may be transferred to the polarizing film and then aged.

Also, on the polarizing film of the present invention at least one functional layers of a protecting layer, a reflection layer, a anti-glare layer, a phase retardation film, a compensation film for a wide view angle, a brightness enhancement film may be formed.

The polarizing film employing the pressure-sensitive adhesive of the present invention can be used in all common liquid crystal display devices, and the kind of the liquid crystal panel is not particularly limited. Preferably, the adhesive polarizing film may be attached on one or both sides of a liquid crystal panel to manufacture a liquid crystal display device.

As described above, the pressure-sensitive adhesive composition of the present invention is advantageous in solving the problem of light leakage by relaxing the stress caused by shrinkage of the polarizing film, when used for a long time under thermal and/or humidity conditions, without sacrificing adhesion durability.

Hereinafter, the present invention is described in more detail through examples. However, the following examples are only for the understanding of the present invention, and the present invention is not limited to or by them.

EXAMPLES

Preparation Step 1: Preparation of Acrylic Copolymer Having High Molecular Weight, H-1

To a 1 L reactor equipped with a cooler enabling nitrogen gas reflux and easy temperature control was added a mixture of monomers comprising 88 parts by weight of n-butyl acrylate (BA), 10 parts by weight of ethyl acrylate (EA) and 2 parts by weight of acrylic acid (M), as specified in Table 1 below. Then, 120 parts by weight of ethyl acetate (EAc) was added as solvent. Purging was performed for 60 minutes with nitrogen gas to remove oxygen. Whiling keeping the temperature at 60° C., reaction was performed for 8 hours by adding 0.03 part by weight of azobisisobutyronitrile (AIBN), which had been diluted to 45% in ethyl acetate, a polymerization initiator. After the reaction was completed, the reaction product was diluted with ethyl acetate (EAc) to obtain a (meth) acrylic copolymer, H-1, which had a solid content of 17 wt % and a weight-average molecular weight of 1,600,000.

Preparation Step 2: Preparation of Acrylic Copolymers Having High Molecular Weight, H-2 and H-3

Acrylic copolymers having high molecular weight, H-2 and H-3 were prepared in the same manner of Preparation step 1, except that the content of each constituent was changed and 150 parts by weight of ethyl acetate was added as solvent, as specified in Table 1. The result is shown in Table 1.

Preparation Step 3: Preparation of Acrylic Copolymer Having Low Molecular Weight, L-1

To a 1 L reactor equipped with a cooler enabling nitrogen gas reflux and easy temperature control were added a mixture of monomers comprising 95.3 parts by weight of n-butyl acrylate, 4.0 parts by weight of ethyl acrylate and 0.7 part by weight of acrylic acid and 2 parts by weight of dodecylmercaptan (DDM) as chain transfer agent, as specified in Table 1. Then, 120 parts by weight of ethyl acetate was added as solvent. Purging was performed for 60 minutes with nitrogen gas to remove oxygen. Whiling keeping the temperature at 60° C., reaction was performed for 8 hours by adding 0.03 part by weight of azobisisobutyronitrile, which had been diluted to 45% in ethyl acetate, a polymerization initiator to obtain a (meth)acrylic copolymer, L-1, which had a solid content of 45 wt % and a weight-average molecular weight of 10,000.

Preparation Step 4: Preparation of Acrylic Copolymers L-2 to L-5

Acrylic copolymers having low molecular weight, L-2 to L-5 were prepared in the same manner of Preparation step 3, except that the content of each constituent was changed, as specified in Table 1. The result is shown in Table 1.

Example 1

<Preparation of Adhesive Layers>

100 parts by weight (by solid content) of the acrylic copolymer having a high molecular weight, H-1 and 15 parts by weight (by solid content) of the acrylic copolymer having a low molecular weight, L-1 were mixed together. 0.5 part by weight of tolylene diisocyanate adduct of trimethylolpropane (TDI-1) was added as multifunctional crosslinking agent. The mixture was diluted to an adequate concentration considering transparency, mixed homogeneously, coated on a release paper and then dried to obtain a uniform adhesive layer having a thickness of 30 microns.

<Lamination Process>

The adhesive layer was adhered to an iodine based polarizing film having a thickness of 185 microns. The resultant polarizing film was cut an appropriate size for testing. The test result is given in Table 2 below.

Testing Example

Durability

The polarizing film (90 mm×170 mm) prepared in Example 1 was attached on both sides of a glass plate (110 mm×190 mm×0.7 mm), with the light absorbing axes perpendicular to each other. In the process, a pressure of about 5 kg/cm$^2$ was applied in a clean room, so that bubble or contamination did not occur. The samples were kept under the condition of 60° C. and 90% R.H. for 1,000 hours. It was identified if bubble and edge lifting had occurred. Heat resistance was evaluated by observing bubble and edge lifting after keeping the samples at 80° C. for 1,000 hours. Observation was performed after keeping the samples at room temperature for 24 hours. Durability was evaluated by observing the adhesive polarizing film 5 months later. Durability evaluation standard was as follows.

○: No bubbles and no edge lifting were observed
Δ: A few bubbles and a little edge lifting were observed
x: A large amount of bubbles and edge lifting were observed Light Transmission Homogeneity (Light Leakage)

Using the same samples, it was observed if light passed through the samples using backlight in a dark room. In the test, the polarizing films (200 mm×200 mm) was attached on both sides of a glass plate (210 mm×210 mm×0.7 mm), with the light absorbing axes perpendicular to each other. The standard for light transmission homogeneity was as follows.

○: No light leaking was observed by the naked eye.
Δ: A little non-uniform light transmission was observed.
X: A severe light leaking from the edge of polarizers was observed.

Examples 2 and 3

Mixing and lamination were performed as Example 1, as specified in Table 2. Durability and light transmission homogeneity were evaluated. The result is given in Table 2.

Comparative Examples 1-6

Mixing and lamination were performed as Example 1, as specified in Table 2. Durability and light transmission homogeneity were evaluated. The result is given in Table

TABLE 1

|  |  |  | H-1 | H-2 | H-3 | L-1 | L-2 | L-3 | L-4 | L-5 |
|---|---|---|---|---|---|---|---|---|---|---|
| Copolymer composition (parts by weight) | Monomer | n-BA | 88.0 | 91.0 | 98.0 | 95.3 | 99.3 | 92.0 | 96.9 | 89.3 |
|  |  | EA | 10.0 | 5.0 |  | 4.0 |  | 6.0 | 3.0 |  |
|  |  | BzA |  |  |  |  |  |  |  | 10.0 |
|  |  | 2-HEMA |  |  | 2.0 |  | 0.7 |  |  | 0.7 |
|  |  | AA | 2.0 | 4.0 |  | 0.7 |  | 2.0 | 0.1 |  |
|  | Chain transfer agent | DDM |  |  |  | 2.0 | 10.0 | 0.7 | 0.4 | 10 |
|  | Polymerization initiator | AIBN | 0.03 | 0.03 | 0.03 | 0.03 | 0.03 | 0.03 | 0.03 | 0.03 |
|  | Solvent | EAc | 120 | 150 | 150 | 120 | 120 | 120 | 120 | 120 |
| Weight-average molecular weight (10,000) |  |  | 160 | 80 | 120 | 1.0 | 0.3 | 2.5 | 9.0 | 0.3 |
| Number of functional groups, on average |  |  |  |  |  | 0.537 | 0.291 | 3.828 | 0.690 | 0.290 | n-BA: n-Butyl acrylate
EA: Ethyl acrylate
BzA: Benzyl acrylate
2-HEMA: 2-Hydroxyethyl methacrylate
AA: Acrylic acid
AIBN: Azobisisobutyronitrile
DDM: Dodecylmercaptan
EAc: Ethyl acetate

TABLE 2

Mixing ratio of acrylic copolymers and physical properties

| Classification | | Exam. 1 | Exam. 2 | Exam. 3 | Comp. Exam. 1 | Comp. Exam. 2 | Comp. Exam. 3 | Comp. Exam. 4 | Comp. Exam. 5 | Comp. Exam. 6 |
|---|---|---|---|---|---|---|---|---|---|---|
| Mixing ratio (parts by weight) | H-1 | 100 | | 100 | | 100 | 100 | 100 | 100 | |
| | H-2 | | | | 100 | | | | | |
| | H-3 | | 100 | | | | | | | 100 |
| | L-1 | 17 | | 12 | 15 | 30 | 2 | | | |
| | L-2 | | 5 | | | | | | | |
| | L-3 | | | | | | | 15 | | |
| | L-4 | | | | | | | | 13 | |
| | L-5 | | | | | | | | | 10 |
| | Crosslinking agent | 0.5 | 0.5 | 0.5 | 0.5 | 0.5 | 0.5 | 0.5 | 0.5 | 0.5 |
| Durability | | O | O | O | X | X | O | O | O | X |
| Light transmission homogeneity | | O | O | O | O | O | X | X | X | O |

As seen in Table 2, all of Examples 1-3 showed good durability and light transmission homogeneity. On the contrary, Comparative Example 1 (the (meth)acrylic copolymer having a weight-average molecular weight of 800,000), Comparative Example 2 (including 30 parts by weight of the (meth)acrylic copolymer having a low molecular weight) and Comparative Example 6 (in which the monomer for copolymerizing the (meth)acrylic copolymer having a high molecular weight and the one for copolymerizing the (meth)acrylic copolymer having a low molecular weight are different) showed very poor durability. Also, Comparative Example 3 (including 2 parts by weight of the (meth)acrylic copolymer having a low molecular weight), Comparative Example 4 (in which the number of the reactive functional groups of the (meth)acrylic copolymer having a low molecular weight is not 0.01-1) and Comparative Example 5 (in which the weight-average molecular weight of the (meth)acrylic copolymer having a low molecular weight falls outside 2,000-30,000) showed slight or severe light transmission non-homogeneity.

The present invention provides an acrylic pressure-sensitive adhesive composition for a polarizing film capable of solving the light leakage problem by relaxing the stress caused by shrinkage of the polarizing film under thermal and humidity conditions, without sacrificing such major characteristics as adhesion durability. Accordingly, if the pressure-sensitive adhesive composition of the present invention is used for the polarizing film of a liquid crystal display device, it can prevent light leakage caused by stress concentration, even after a considerable lapse of time.

While the present invention has been described with reference to the preferred embodiments, those skilled in the art will appreciate that various modifications and substitutions can be made thereto without departing from the spirit and scope of the present invention as set forth in the appended claims.

What is claimed is:

1. An acrylic pressure-sensitive adhesive composition for a polarizing film comprising
   a) 100 parts by weight of a (meth)acrylic copolymer having a high molecular weight, which is copolymerized from a (meth)acrylic acid ester monomer and a vinylic and/or an acrylic monomer having a functional group capable of crosslinking with a multifunctional crosslinking agent and has a weight-average molecular weight of at least 1,000,000;
   b) 5-20 parts by weight of a (meth)acrylic copolymer having a low molecular weight, which comprises the same monomer comprised in the main chain of the (meth)acrylic copolymer of a), has a weight-average molecular weight of 2,000-30,000 and comprises 0.01-1 monomer, per one molecule of the copolymer on average, having a functional group capable of reacting with the crosslinking agent of c); and
   c) 0.01-10 parts by weight of a multifunctional crosslinking agent, wherein the multifunctional crosslinking agent is at least one selected from the group consisting of an isocyanate compound, an epoxy compound, an aziridine compound and a metal chelate compound.

2. The acrylic pressure-sensitive adhesive composition for a polarizing film of claim 1, wherein a) the (meth)acrylic copolymer having a high molecular weight comprises 91.0-99.9 parts by weight of the (meth)acrylic acid ester monomer and 0.1-9 parts by weight of the vinylic and/or the acrylic monomer having a functional group capable of crosslinking with a multifunctional crosslinking agent.

3. The acrylic pressure-sensitive adhesive composition for a polarizing film of claim 1, wherein the (meth)acrylic acid ester monomer of a) is at least one alkyl ester having 2-8 carbon atoms, which is selected from the group consisting of butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, 2-ethylbutyl (meth)acrylate and benzyl acrylate.

4. The acrylic pressure-sensitive adhesive composition for a polarizing film of claim 1, wherein the monomer having a functional group capable of crosslinking of a) is at least one selected from the group consisting of 2-hydroxyethyl (meth)acrylate, 2-hydroxypropyl (meth)acrylate, 2-hydroxyethylene glycol (meth)acrylate, 2-hydroxypropylene glycol (meth)acrylate, acrylic acid, methacrylic acid, acrylic acid dimer, itaconic acid, maleic acid and maleic acid anhydride.

5. The acrylic pressure-sensitive adhesive composition for a polarizing film of claim 1, wherein the acrylic copolymer is prepared by a method selected from the group consisting of solution polymerization, photopolymerization, bulk polymerization, suspension polymerization and emulsion polymerization.

6. The acrylic pressure-sensitive adhesive composition for a polarizing film of claim 1, which has a crosslinking density of 5-95%.

7. An adhesive polarizing film comprising an adhesive layer prepared from the acrylic pressure-sensitive adhesive composition according to claim 1 on one or both sides of the polarizing film.

8. The adhesive polarizing film of claim 7, which further comprises at least one film selected from the group consisting of a protection film, a reflection film, a phase retardation film, a compensation film for wide view angle or a brightness enhancement film.

9. A liquid crystal display device comprising a liquid crystal panel in which the adhesive polarizing film of claim 8 is attached on one or both sides of a liquid crystal cell.

10. A liquid crystal display device comprising a liquid crystal panel in which the adhesive polarizing film of claim 7 is attached on one or both sides of a liquid crystal cell.

* * * * *